US012321384B2

(12) United States Patent
Yoo et al.

(10) Patent No.: US 12,321,384 B2
(45) Date of Patent: Jun. 3, 2025

(54) METHOD AND DEVICE FOR VIDEO MOMENT RETRIEVAL BASED ON SELECTIVE DEBIASING

(71) Applicant: KOREA ADVANCED INSTITUTE OF SCIENCE AND TECHNOLOGY, Daejeon (KR)

(72) Inventors: Changdong Yoo, Daejeon (KR); Sunjae Yoon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/386,311

(22) Filed: Nov. 2, 2023

(65) Prior Publication Data

US 2024/0176819 A1 May 30, 2024

(30) Foreign Application Priority Data

Nov. 17, 2022 (KR) .......................... 10-2022-0154621

(51) Int. Cl.
*G06F 7/00* (2006.01)
*G06F 16/735* (2019.01)
(Continued)

(52) U.S. Cl.
CPC ........ *G06F 16/735* (2019.01); *G06F 16/7837* (2019.01); *G06V 20/41* (2022.01); *G06V 20/46* (2022.01)

(58) Field of Classification Search
CPC .. G06F 16/735; G06F 16/732; G06F 16/7867; G06F 16/7837; G06F 16/7834; G06F 16/7847; G06F 16/739; G06F 16/7844; G06F 16/686; G06F 16/685; G06F 16/433; G06V 20/46; G06V 20/41; G06V 20/49; G06V 20/48; G06V 20/44
See application file for complete search history.

(56) References Cited

U.S. PATENT DOCUMENTS

2013/0129324 A1* 5/2013 Uro ........................ H04N 5/272
386/E5.028
2017/0052964 A1* 2/2017 Hu ........................ G06F 16/739
(Continued)

FOREIGN PATENT DOCUMENTS

KR 10-0896336 5/2009
KR 10-1871925 7/2018

OTHER PUBLICATIONS

Jie Lei et al., "TVR: A Large-Scale Dataset for Video-Subtitle Moment Retrieval", arXiv:2001.09099v2 [cs.CV] Aug. 18, 2020.
(Continued)

*Primary Examiner* — Mohammad A Sana
(74) *Attorney, Agent, or Firm* — LEX IP MEISTER, PLLC

(57) ABSTRACT

According to an embodiment of the present disclosure, a method for video moment retrieval performed by a computing device may include obtaining a pair of video and query to perform the video moment retrieval, determining based on meaning of the query whether a retrieval bias regarding the query has a positive effect on the video moment retrieval, and selectively removing the retrieval bias from a result of the video moment retrieval according to the determination result to generate a final retrieval result.

16 Claims, 12 Drawing Sheets

(51) Int. Cl.
*G06F 16/783* (2019.01)
*G06V 20/40* (2022.01)

(56) References Cited

U.S. PATENT DOCUMENTS

| | | | |
|---|---|---|---|
| 2021/0266641 A1* | 8/2021 | Selfors | G06V 20/49 |
| 2022/0261550 A1* | 8/2022 | Moon | G06F 40/30 |
| 2023/0281247 A1* | 9/2023 | Lee | G06V 20/46 |
| 2024/0070197 A1* | 2/2024 | Lee | G06F 16/738 |

OTHER PUBLICATIONS

Linjie Li et al., "HERO: Hierarchical Encoder for Video+Language Omni-representation Pre-training". arXiv:2005.00200v2 [cs.CV] Sep. 29, 2020.

Hao Zhang et al., "Video Corpus Moment Retrieval with Contrastive Learning", arXiv:2105.06247v1 [cs.CL] May 13, 2021.

Bowen Zhang et al., "A Hierarchical Multi-Modal Encoder for Moment Localization in Video Corpus", arXiv:2011.09046v2 [cs.CV] Nov. 24, 2020.

Sunjae Yoon, et al., "Selective Query-guided Debiasing for Video Corpus Moment Retrieval", European Conference on Computer Vision, Tel Avive 2022.

\* cited by examiner

FIG. 2C

Queries where retrieval bias serve as 'good bias'

Query : Phoebe watches a television
commercial about a cat.
⋮
Query : House is watching on a television Queries where retrieval bias serve as 'bad bias'

Query : The friends dance along to a
television
⋮
Query : House smacks the television

METHOD AND DEVICE FOR VIDEO MOMENT RETRIEVAL BASED ON SELECTIVE DEBIASING

CROSS-REFERENCE TO RELATED APPLICATION

This application claims priority to and the benefit of Korean Patent Application No. 10-2022-0154621 filed in the Korean Intellectual Property Office on Nov. 17, 2022, and Korean Patent Application No. filed in the Korean Intellectual Property Office on, the entire contents of which are incorporated herein by reference.

BACKGROUND

(a) Field

The present disclosure relates to a method and device for video moment retrieval based on selective debiasing.

(b) Description of the Related Art

Recently, as video streaming services (e.g., YouTube, Netflix, etc.) have grown rapidly, the development of video retrieval technology is being promoted. One of these video retrieval technologies, video moment retrieval (VMR), plays an essential role in supporting many front-line conversational AI systems, including video captioning, video question answering, and visual dialogue, etc.

The VMR aims to localize temporal moments in videos related to text queries. As interest in video retrieval has increased recently, the VMR is performed in a more general retrieval form called video corpus moment retrieval (VCMR).

Like the VMR, the VCMR aims to localize a moment, but search spaces are expanded into a 'video corpus' composed of numerous videos. Therefore, for a given query, the VCMR performs two subtasks: (1) identifying relevant videos in the video corpus and (2) determining the location of the moment in the identified videos.

Despite these efforts to generalize the video retrieval, the VCMR still relies on retrieval bias, so the system disturbs accurately training multi-modal interactions. The retrieval bias is due to convergence to biased moment prediction by training frequent co-occurrence patterns between queries and moments, which spuriously correlate objects (e.g. a pencil) mentioned in the queries with moments (e.g. scene of writing with a pencil) where the objects frequently appear in videos.

Since it is assumed that the retrieval bias decreases retrieval, the recent debiasing method focuses on removing or mitigating the retrieval bias. However, there are many queries for which the biased predictions are somewhat helpful, and therefore, in some cases, there is a need to preserve the biased prediction.

Accordingly, there is a need for a technology capable of accurately and efficiently performing video moment retrieval appropriately utilizing only the retrieval bias that has a positive effect on moment retrieval within video by selectively removing the retrieval bias.

SUMMARY

The present disclosure attempts to provide a method and device for video moment retrieval selectively utilizing only a retrieval bias that has a positive effect on moment retrieval within video by distinguishing between a positive retrieval bias and a negative retrieval bias based on meaning of a given query. In addition to the above problems, the present disclosure may be used to achieve other problems not specifically mentioned.

According to an embodiment of the present disclosure, a method for video moment retrieval performed by a computing device includes obtaining a pair of video and query to perform the video moment retrieval, determining based on meaning of the query whether a retrieval bias regarding the query has a positive effect on the video moment retrieval, and selectively removing the retrieval bias from a result of the video moment retrieval according to the determination result to generate a final retrieval result.

The obtaining may include embedding a video feature based on the video, matching a subtitle feature embedded based on a subtitle included in the video with the video feature to generate a subtitle-matched video feature, and matching a query feature embedded based on the query with the subtitle-matched video feature and the query feature to generate a query-matched video feature. The video moment retrieval may be performed using the query feature and the query-matched video feature.

The retrieval bias may allow the video moment retrieval to be performed in a direction in which the retrieval result of the video moment retrieval converges on scenes that generally have a high frequency of co-occurrence with at least one object included in the query.

The determining whether the retrieval bias regarding the query has a positive effect on the video moment retrieval may include retrieving, by a basic retrieval model, a moment inferred within the video based on the query, retrieving, by a biased retrieval model, a biased moment inferred within the video based on the retrieval bias regarding the query, and determining based on the meaning of the query whether the biased moment is positive or negative relative to the moment inferred by the basic retrieval model.

The basic retrieval model may be pre-trained to predict a start time and an end time of the moment corresponding to the query within the video according to the input of the pair of video and query, based on training dataset comprising a pair of training query and training video, and annotation for a start time and an end time of moment corresponding to the training query within the training video.

The biased retrieval model may be pre-trained to predict a start time and an end time of the biased moment based on the retrieval bias regarding the query within the video according to the input of the pair of video and query, based on training dataset comprising pairs of object words in the training query and training videos.

The end time may be predicted based on the start time previously predicted.

The determining whether the retrieval bias regarding the query has a positive effect on the video moment retrieval may include determining whether the retrieval bias has a positive effect on the video moment retrieval based on one or more decision rules including a co-occurrence table and a learnable confounder.

The co-occurrence table may be a table constructed by counting co-occurrence of predicates for each object word in the training query so that each row represents the frequency of co-occurrence of the predicates for each object word. The determining whether the retrieval bias regarding the query has a positive effect on the video moment retrieval may include identifying key predicates associated with each of the object words in the query in the co-occurrence table and determining that the retrieval bias has a positive effect on the video moment retrieval when the key predicates are included in the query.

The learnable confounder may be constructed by pre-training an object-scene spurious correlation to predict a predicate spuriously correlated with an object word from the object word. The determining whether the retrieval bias regarding the query has a positive effect on the video moment retrieval may include determining that the retrieval bias has a positive effect on the video moment retrieval, when similarity between the predicate predicted by the confounder from the object word in the query and the predicate present in the query is greater than or equal to a threshold.

According to another embodiment of the present disclosure, a device for video moment retrieval may include a query-video input unit configured to obtain a pair of video and query to perform the video moment retrieval, and a selective unbiased determination unit configured to determine whether a retrieval bias regarding the query has a positive effect on the video moment retrieval, based on meaning of the query, and selectively remove the retrieval bias from a result of the video moment retrieval according to the determination result and generate a final retrieval result.

The query-video input unit may embed a video feature based on the video, match a subtitle feature embedded based on a subtitle included in the video with the video feature to generate a subtitle-matched video feature, and match a query feature embedded based on the query with the subtitle-matched video feature and the query feature to generate a query-matched video feature.

The retrieval bias may allow the video moment retrieval to be performed in a direction in which the retrieval result of the video moment retrieval converges on scenes that generally have a high frequency of co-occurrence with at least one object included in the query.

The device for video moment retrieval may further include a basic retrieval model configured to retrieve a moment inferred within the video based on the query, and a biased retrieval model configured to retrieve the biased moment inferred within the video based on the retrieval bias regarding the query. The selective unbiased determination unit may determine based on the meaning of the query whether the biased moment is positive or negative relative to the moment inferred by the basic retrieval model.

The basic retrieval model may be pre-trained to predict a start time and an end time of the moment corresponding to the query within the video according to the input of the pair of video and query, based on training dataset comprising a pair of training query and training video, and annotation for a start time and an end time of moment corresponding to the training query within the training video.

The biased retrieval model may be pre-trained to predict a start time and an end time of the biased moment based on the retrieval bias regarding the query within the video according to the input of the pair of video and query, based on training dataset comprising pairs of object words in the training query and training videos.

The end time may be predicted based on the start time previously predicted.

The selective unbiased determination unit may determine whether the retrieval bias has a positive effect on the video moment retrieval based on one or more decision rules including a co-occurrence table and a learnable confounder.

The co-occurrence table may be a table constructed by counting co-occurrence of predicates for each object word in the training query so that each row represents the frequency of co-occurrence of the predicates for each object word. The selective unbiased determination unit may identify key predicates associated with each of the object words in the query in the co-occurrence table and determine that the retrieval bias has a positive effect on the video moment retrieval when the key predicates are included in the query.

The learnable confounder may be constructed by pre-training an object-scene spurious correlation to predict a predicate spuriously correlated with an object word from the object word. The selective unbiased determination unit may determine that the retrieval bias has a positive effect on the video moment retrieval, when similarity between the predicate predicted by the confounder from the object word in the query and the predicate present in the query is greater than or equal to a threshold.

According to an embodiment of the present invention, it is possible to perform efficient video moment retrieval by selectively utilizing a positive retrieval bias based on meaning of a given query.

According to an embodiment of the present invention, it is possible to perform video moment retrieval with improved interpretability by selectively removing negative retrieval bias based on meaning of a given query.

BRIEF DESCRIPTION OF THE DRAWINGS

FIGS. 2A to 2C are diagrams illustrating an example of having a positive effect on a retrieval bias according to some embodiments of the present disclosure.

DETAILED DESCRIPTION OF THE EMBODIMENTS

Figure 1:
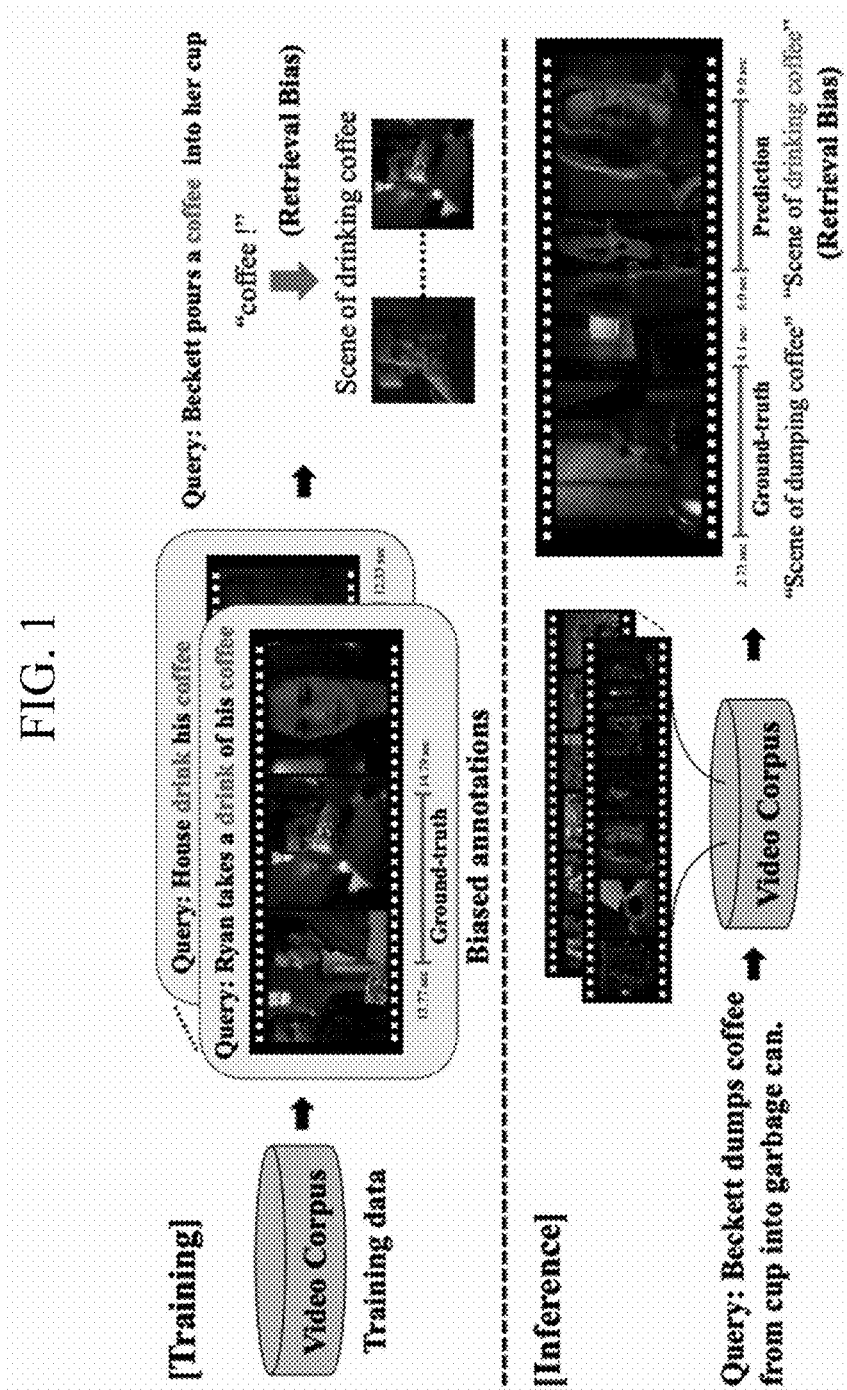
FIG. 1 is a diagram illustrating an example of having a negative effect on retrieval bias according to some embodiments of the present disclosure.

Hereinafter, embodiments of the present disclosure will be described in detail with reference to the accompanying drawings so that those skilled in the art to which the present disclosure pertains may easily practice the present disclosure. However, the present disclosure may be modified in various different forms, and is not limited to embodiments provided herein. In addition, components unrelated to a description will be omitted in the accompanying drawings in order to clearly describe the present disclosure, and similar reference numerals will be used to denote similar components throughout the present specification.

In the present disclosure, unless explicitly described to the contrary, the word "comprise", and variations such as "comprises" or "comprising", will be understood to imply the inclusion of stated elements but not the exclusion of any other elements. Devices that constitute a network may be implemented as hardware, software, or a combination of hardware and software.

FIG. 1 is a diagram illustrating an example of having a negative effect on retrieval bias according to some embodiments of the present disclosure.

Specifically, FIG. 1 illustrates a moment prediction result when the query "Beckett dumps coffee from cup into garbage can" is given in an inference step. Referring to FIG. 1, the conventional retrieval system makes an incorrect moment prediction as a scene of 'drinking coffee' for the given query.

This is because annotations in a training dataset include many co-occurrences between the query's object word 'coffee' and the scene 'drinking coffee', leading to biased moment predictions. This retrieval bias limits an object (e.g., coffee) to a specific scene (e.g., a scene of drinking coffee), so that other scenes related to the corresponding object word lose the opportunity to be retrieved.

Since it is assumed that the bias lowers retrieval, the recent debiasing method focuses on removing or mitigating the retrieval bias. However, since there are also cases where biased predictions are helpful, as illustrated in FIGS. 2A to 2C below, there is a need to selectively mitigate the bias.

Figure 2A:
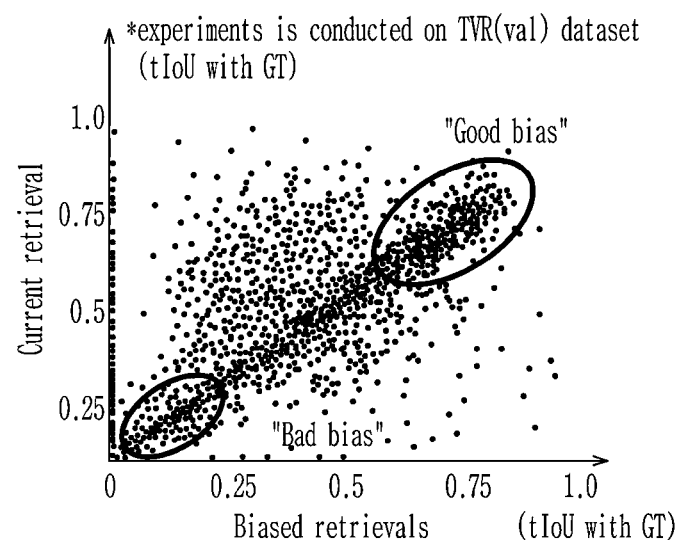
Figure 2B:
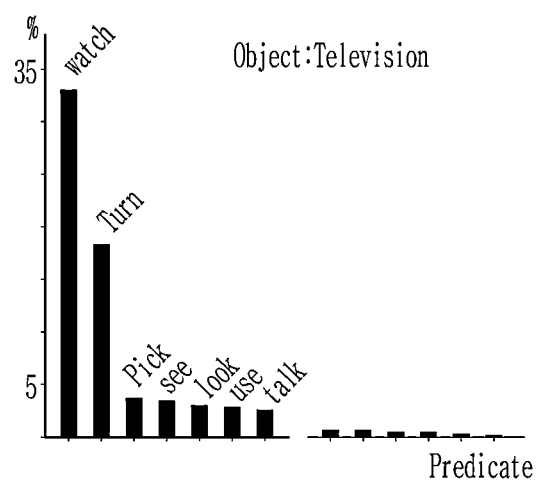

FIGS. 2A to 2C are diagrams illustrating an example of having a positive effect on retrieval bias according to some embodiments of the present disclosure.

First, FIG. 2A illustrates temporal intersection of union (tIoU) scores for all queries between the predicted moment and a ground-truth moment. The prediction is from two retrieval models: (1) a current best-performance model and (2) a biased retrieval model.

The biased retrieval model predicts the biased moment for the given query. To implement this, a simple toy model is generated and instead of 'full query sentence', 'nouns in the query' is provided as input. This causes a deficiency in meaning of an original query and forces the model to rely on predicting the moment when those nouns are most likely to be used.

Next, the predictions of these two retrieval models are represented as a joint-plot of the tIoU scores. In this case, the plot shows a positive correlation. Referring to FIG. 2A, it can be seen that this correlation is noticeable in the predictions of low and high tIoU scores. This indicates that the current retrieval is aided simultaneously with being damaged by the retrieval bias. In other words, the retrieval bias includes both positive and negative biases.

In this regard, FIG. 2B illustrates an example of the basic principle for distinguishing between the positive and negative bias. FIG. 2B illustrates that predicates appearing together with a specific word (e.g., television) in all queries are examined, and thus, one or two predicates (e.g., watch, turn) are mainly combined with the corresponding word.

That is, query sentences including object words and their most frequently co-occurring predicates have benefits from a retrieval bias (i.e. good bias) because there are many scenes (e.g. a scene of watching television) corresponding thereto, while queries with different predicates have poor performance due to the retrieval bias (i.e., incorrect bias). In this regard, FIG. 2C illustrates an example of a query in which the retrieval bias (i.e., a scene of watching television) acts as a positive bias or a negative bias, respectively.

Figure 3:
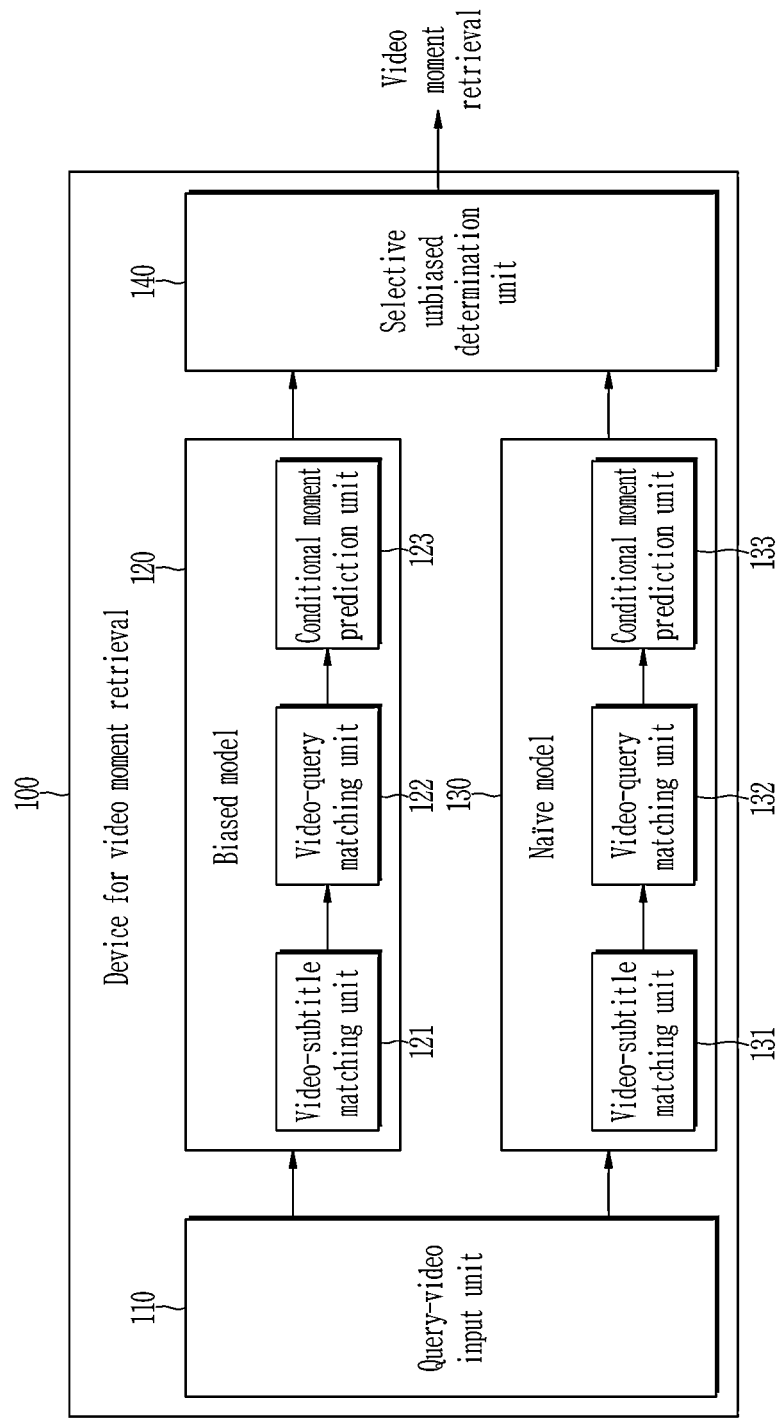
FIG. 3 is a block diagram illustrating a configuration of a device for video moment retrieval according to some embodiments of the present disclosure.

FIG. 3 is a block diagram illustrating a configuration of a device for video moment retrieval according to some embodiments of the present disclosure.

Referring to FIG. 3, the device 100 for video moment retrieval may include a query-video input unit 110, a biased model 120, a naive model 130, and a selective unbiased determination unit 140. However, the above-described configuration is not essential for implementing the device 100 for video moment retrieval according to the present disclosure, so the device 100 for video moment retrieval may be implemented with more or fewer components than the listed components.

The device 100 for video moment retrieval may include two moment retrieval models, biased moment retrieval (BMR) 120 and naïve moment retrieval (NMR) 130, respectively, for predicting a start-end time of a moment in video related to a first input query.

Since the naive model 130 is trained according to the original purpose of VCMR, the naive model 130 may be prepared by sufficiently training visual-verbal alignment based on the pair of video and query. On the other hand, since the biased model 120 is trained for the purpose of training the retrieval bias, the biased model 120 may be trained based on the object word and video of the query instead of the entire query sentence.

In this case, a word loses contextual meaning of the original query, making it difficult for the biased model 120 to properly train the visual-verbal alignment, and rather relying on spurious correlation that connects the given word to a specific scene.

Based on these two moment retrieval models, the selective unbiased determination unit 140 of the device 100 for video moment retrieval may determine whether the biased prediction of the biased model 120 is 'positive bias' or 'negative bias' relative to the prediction of the naïve model 130 through the understanding of the meaning of the query.

The selective unbiased determination unit 140 may use one or more decision rules to determine the positive bias and negative bias, in which the decision rules may include a co-occurrence table and a learnable confounder, which will be described later.

The query-video input unit 110 of the device 100 for video moment retrieval may receive the paired query and video and extract features through encoding.

The input video may include subtitles. 2D and 3D feature extractors may be used to encode videos. A final video feature v may be embedded based on the 2D and 3D features extracted from the videos.

Meanwhile, text such as a video's subtitle S and a query q paired with the video may be encoded with token embedding. All words in the subtitle and query may be tokenized into word tokens. Based on the tokens, a final subtitle feature $s_i$ and a final query feature $q_r$ may be embedded like the final video feature v.

In this way, the embedded video features, subtitle features, and query features may be used to match video-subtitle and video-query, respectively, within each retrieval model 120 and 130 for multi-modality interaction to generate the matched features.

Hereinafter, the biased model 120 and the naive model 130 will be described, respectively. While the naive model 130 is a moment retrieval model designed for the original purpose of the moment retrieval, the biased model 120 may be the moment retrieval model designed for the purpose of revealing the retrieval bias.

The naive model 130 may be any model capable of performing the model moment retrieval, and the biased model 120 may also be a model that follows the same structure as the naive model 130 and is trained through the same process.

First, the naive model 130 may be trained based on a training dataset that uses, as the annotations, the pair of query and video and a start time and an end time of the moment in the video corresponding to the query. The trained naive model 130 may receive the pair of query and video as input, and predict the start time and end time of the moment corresponding to the query within the video.

The biased model 120 may also be trained in the same way as the naive model 130. However, instead of the feature of the entire query 'sentence', the feature of the 'object word' within the query may be used as the input. Because these object words lose the contextual meaning of the original query, the biased model 120 may rely only on object words to retrieve the video moment, prioritizing the moment that commonly appears together with the corresponding object.

The biased model 120 and the naive model 130 may include video-subtitle matching units 121 and 131, video-query matching units 122 and 132, and conditional moment prediction units 123 and 133, respectively.

The video-subtitle matching units 121 and 131 and the video-query matching units 122 and 132 are to provide the multi-modality interaction between the video and text, respectively, and may receive the video and text (i.e., subtitle or query) as the input to generate the text-matched video feature. Here, the feature matching (hereinafter, "modality matching attention (MMA)") between the multiple modalities may be performed through transformer-based multi-layer attention.

Specifically, the video-subtitle matching units 121 and 131 of the two moment retrieval models 120 and 130 share common contextual semantics between the video frame and subtitle that appear at the same time, and therefore, match the frame feature within the video and the text features of the subtitle that appear along therewith to generate the subtitle-matched video feature.

Meanwhile, the video-query matching units 122 and 132 of the two moment retrieval models 120 and 130 may match a subtitle-matched video feature $v^*$ and a text feature $q_x$ of a query to generate the query-matched video feature. Accordingly, the query-matched video feature may be redefined as the final video feature used for the moment prediction using the video and query including subtitles.

In the case of the naive model 130, the text feature $q_x$ of the query is the query feature $q_r$ for the entire query sentence, while in the case of biased model 120, as described above, the object words in the query are used instead of the query sentence to train the retrieval bias, so an object feature $q_o$ for the object words of the query may be used as the text feature $q_x$ of the query.

Since nouns in the query mainly include object words, the object feature $q_o$ may be prepared by identifying a part of speech (POS) of all words included in the query and sampling noun words.

The conditional moment prediction units 123 and 133 of the two moment retrieval models 120 and 130 may first predict a start time $t_{st}$ of the moment in the video corresponding to the query for the query feature $q_x$ and a final video feature $v_x^\dagger$, and predict the end time based on the predicted start time.

In other words, the conditional moment prediction units 123 and 133 predict the start time and end time independently in the moment prediction, but may perform other predictions (e.g. end time) based on causal information according to one prediction (e.g., start time).

The selective unbiased determination unit 140 of the device 100 for video moment retrieval may determine whether the biased prediction of the biased model 120 is the 'positive bias' or 'negative bias' with respect to the prediction of the naive model 130 through the understanding of the meaning of the query, and use the biased predictions of the biased model 120 to perform selective debiasing from the predictions of the naive model 130.

The selective unbiased determination unit 140 may use one or more decision rules to determine the positive bias and negative bias, in which the decision rules may include a co-occurrence table and a learnable confounder. Hereinafter, the co-occurrence table will first be described.

Since all the spurious correlations that cause the retrieval bias between objects and scenes cannot be directly known, they may be approximated by referring to the statistics of all query sentences.

Specifically, assuming that the predicate of the query describes the scene in the video, the co-occurrence of predicates for each object word in the query sentence may be counted based on the top K (e.g., K=100) frequent objects and predicates in the training queries. The counting may construct a co-occurrence table $T_d \in \mathbb{R}^{K \times K}$ between objects and predicates, and the row of the co-occurrence table $T_d$ may indicate the co-occurrence frequency of predicates for the specific object.

To negatively or positively determine the biased prediction of the biased model 120 for the contrastive learning using the naive model 130, the selective unbiased determination unit 140 may use the prior knowledge about a predominant object-predicate pair in the co-occurrence table.

For the input object words of the biased model 120, the selective unbiased determination unit 140 may identify the top n (e.g., n=10) main predicates in the co-occurrence table. When the top n predicates appear in the given query sentence, the selective unbiased determination unit 140 may determine the prediction of the biased model 120 to be positive rather than negative.

Such co-occurrence tables may be a discrete approximation of the retrieval bias since they assume the predefined predicates to perform the selective debiasing. To better approximate this, it may be composed of K confounders (e.g., K=100) with d-dimensional learnable parameters, and use a confounder $T_d \in \mathbb{R}^{K \times K}$ that may train the object-scene spurious correlations. Hereinafter, the learnable confounder, which is another decision rule of the selective unbiased determination unit 140, will be described.

Assuming that the predicate words sufficiently include the contextual meaning of the video scenes, a predicate feature $Y_B$ spuriously correlated with the object word $q_o$ may be predicted from a confounder Z. When $Y_B$ is similar to a predicate feature $Y_C$ of the original query used in the naive model 130, this indicates that the predicate $Y_B$ acquired from the object words and $Y_C$ of the given query have similar contextual meaning. Accordingly, in this case, the retrieval of the biased model 120 needs to be used positively.

In this case, Z may be pre-trained so that the generated predicate $Y_B$ is the biased predicate of the object by allowing Z to train the spurious correlation between the object and the predicate. To train Z, $Y_B$ may be regressed into $Y_C$. This means that Z is trained to generate the predicate feature $Y_B$ that typically appears together with the given object words in the query.

Figure 4:
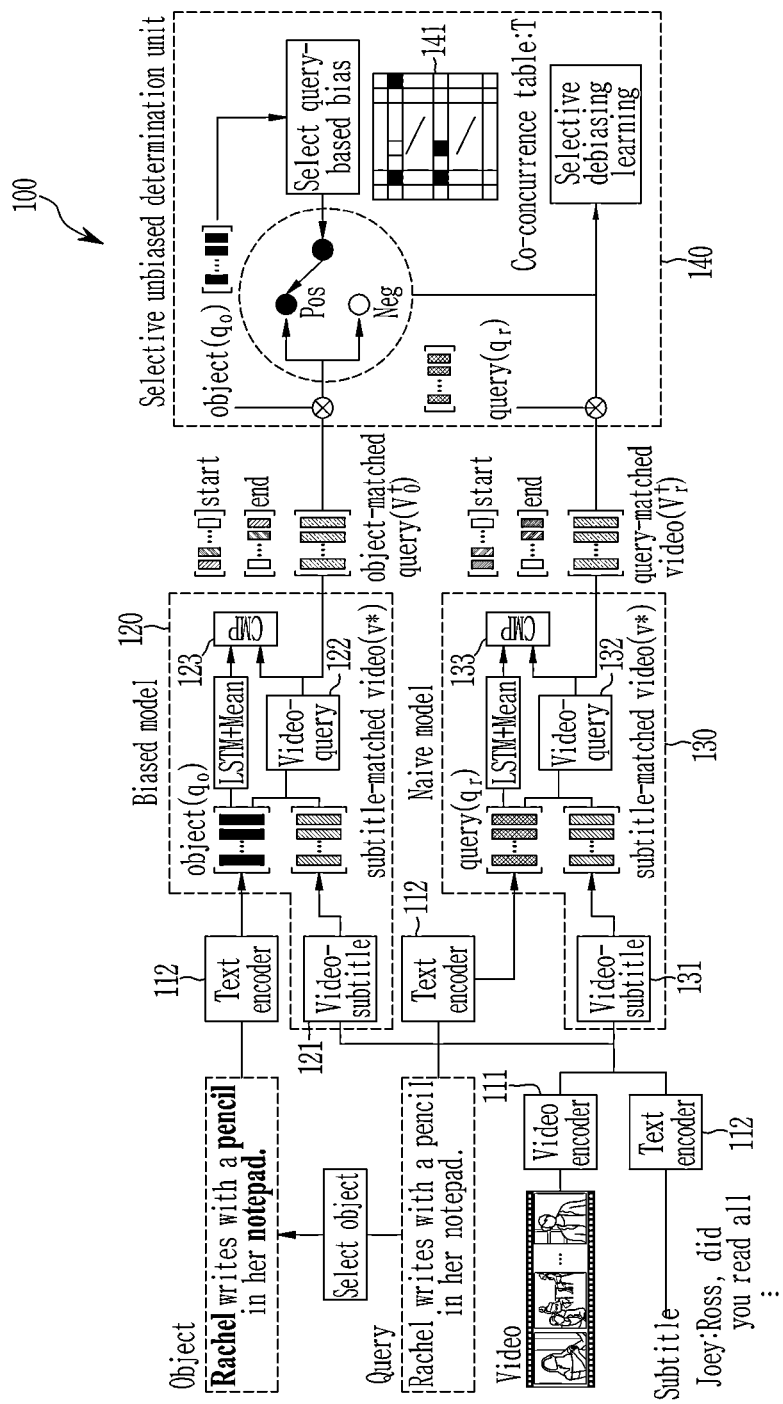
FIG. 4 is a diagram illustrating in detail a method of operating the device for video moment retrieval according to some embodiments of the present disclosure.

After pre-training the confounder Z, the selective unbiased determination unit 140 may calculate cosine similarity r=cosine($Y_B$, $Y_C$). When the calculated value of r is greater than 0, the retrieval of the biased model 120 may be used positively, otherwise it may be used negatively:

FIG. 4 is a diagram illustrating in detail the method of operating the device for video moment retrieval according to some embodiments of the present disclosure.

Referring to FIG. 4, first, the query-video input unit 110 may include a video encoder 111 and a text encoder 112 for obtaining a query and video and extracting features through encoding.

The video encoder 111 may use 2D and 3D feature extractors to encode the input video. For example, in the case of the 2D feature extraction, ResNet-101 pre-trained on VideoNet may be used, and in the case of the 3D feature extraction, SlowFast pre-trained on Kinetics may be used. However, it is not limited thereto.

The video encoder 111 may embed the final video feature v as in Equation 1 below based on the extracted 2D and 3D features (e.g., 4352-dimensional feature V). Here, $N_v$ may be the number of frames of the video, and $\delta_v$ may be a d-dimensional embedder. The video encoder 111 may embed the final video features onto layer normalization (LN) and positional encoding (PE):

$$v = LN(\delta_V(V) + PE(V)) \in \mathbb{R}^{N_v \times d}, (V = \{V_i\}_{i=1}^{N_V}) \quad \text{(Equation 1)}$$

The text encoder 112 may encode text such as a subtitle S={sub(i)}$_i^{N_s}$ (where Ns is the number of subtitles) of the video and the query q paired with the video, using the token embedding. For example, contextualized token embedding may be used in pre-trained RoBERTa. All words in the subtitle and query may be tokenized into word tokens (e.g., 5072-dimensional word tokens) and expressed as Equation 2 below. Here, $L_{s_i}$ is the number of words in the subtitle and $L_q$ is the number of words in the query:

$$W_{sub(i)} = \{w_{sub(i)}^j\}_{j=1}^{L_{s_i}}$$
$$W_q = \{w_q^j\}_{j=1}^{L_q} \quad \text{(Equation 2)}$$

Like the final video feature v, the text encoder 112 may embed the final subtitle feature $s_i$ and the final query feature $q_r$ based on the tokens, as in Equation 3 through the d-dimensional embedder $\delta_v$.

$$s_i = LN(\delta_t(W_{sub(i)}) + PE(W_{sub(i)})) \in \mathbb{R}^{L_{s_i} \times d} \quad \text{(Equation 3)}$$
$$q_r = LN(\delta_t(W_q) + PE(W_q)) \in \mathbb{R}^{L_q \times d}$$

In this way, the embedded video features, subtitle features, and query features may be used to match video-subtitle and video-query, respectively, within each retrieval model 120 and 130 for multi-modality interaction to generate the matched features.

The video-subtitle matching units 121 and 131 and the video-query matching units 122 and 132 in each retrieval models 120 and 130 are for providing the multi-modality interaction between the video and text, and may receive the video and text (i.e., subtitle or query) as the input to generate the text-matched video feature. Here, the feature matching (hereinafter, "modality matching attention (MMA)") between the multiple modalities may be performed through transformer-based multi-layer attention.

For the feature matching between the multiple modalities, the d-dimensional video feature x and the text feature y may be defined as in Equation 4. Here, n and m may represent the number of words in the text and the number of frames in the video, respectively:

$$x = [x_1, \ldots, x_n] \in \mathbb{R}^{n \times d}$$
$$y = [y_1, \ldots, y_m] \in \mathbb{R}^{m \times d} \quad \text{(Equation 4)}$$

To provide the multi-modality interaction between the video feature x and the text features y, z may be constructed by connecting the video feature x and the text feature y along the video frame and a word axis, and the self-attention may be performed on z. In addition, by adding the fixed token embedding as illustrated in Equation 5 to the video feature x and the text feature y, a transformer may identify heterogeneity between the video feature x and the text feature y as illustrated in Equation 6.

$$t_{<x>} \in \mathbb{R}^{n \times d}$$
$$t_{<y>} \in \mathbb{R}^{n \times d} \quad \text{(Equation 5)}$$
$$x = x + t_{<x>}, \ y = y + t_{<y>}$$
$$z = [x \| y] \in \mathbb{R}^{l \times d}$$
$$z^* = \text{Self-Attention}(z) \in \mathbb{R}^{l \times d}$$
$$x^* = LN(z^*[:n] + x) \in \mathbb{R}^{n \times d}$$
$$MMA(x, y) = x^* \quad \text{(Equation 6)}$$

In Equation 6, [•‖•] means concatenation, and l=n+m is the number of frames and words in the video. Since [:] indicates a slicing operation along the axis l, the video feature $z^*[:n]$ of $z^*$ is used as the text-matched video feature $x^*$. Therefore, the MMA between the video and the text described above may generate the text-matched video feature $x^*$ that understands language meaning of y.

The video-subtitle matching units 121 and 131 of the two moment retrieval models 120 and 130 match the frame features within the video and the text feature of the subtitle that appears together, thereby generating the subtitle-matched video feature.

The video frame and subtitle that appear simultaneously may share the common contextual semantics. To generate the subtitle-matched video feature, the video frames that share a single subtitle may first be collected, and thus, the video frame feature v may be reconstructed into a video clip c={$c_i$}$_{i=1}^{N_s}$. Here, $c_i$ includes a video frame sharing an ith subtitle $s_i$, and $N_s$ is the number of clips corresponding to the number of subtitles. Therefore, the video clip matching the ith subtitle may be expressed as illustrated in Equation 7 below.

$$c^*_i = MMA(c_i, s_i) \quad \text{(Equation 7)}$$

Next, a recombination of all the video clips is performed as $v^* = c^*_1 \cup \ldots \cup c^*_{N_s}$ to reconstruct the original frame, and $v^* = \mathbb{R}^{N_v \times d}$ may be defined as the subtitle-matched video feature.

The video-query matching units 122 and 132 of the two moment retrieval models 120 and 130 may match a subtitle-matched video feature v* and a text feature $q_x$ of a query to generate the query-matched video feature.

In the case of the naive model 130, the text feature $q_x$ of the query is the query feature $q_r$ for the entire query sentence, while in the case of biased model 120, as described above, the object words in the query are used instead of the query sentence to train the retrieval bias, so the object feature $q_o$ for the object words of the query may be used as the text feature $q_x$ of the query.

Since the nouns in the query mainly include the object words, it is possible to first identify the part of speech (POS) of all words included in the query and sample the noun words as in Equation 8 below:

$$W_O = \text{Noun}(W_q) \quad \text{(Equation 8)}$$

$$q_o = \text{LN}(\delta_t(W_O)) + PE(W_O)) \in \mathbb{R}^{L_{q_o} \times d}$$

Here, Noun( ) represents a noun filtering operation using a POS tagger, and $L_{q_o}$ represents the number of object words in the query. The object features $q_o$ may also be embedded from $W_o$ as in Equation 3.

In this way, the query feature $q_r$ and the object feature $q_o$ may be prepared for the video-query matching. In other words, the text feature $q_x$ of the query may be defined as $q_x \in \{q_r, q_o\}$. The video-query matching may be performed as in Equation 9 below. $v^{**}$ may represent the query-matched video feature, and thus, $v_x^\dagger$ may be redefined as the final video feature for moment prediction using $q_x$:

$$v^{**} = MMA(v^*, q_x) = v_x^\dagger \in \mathbb{R}^{N_v \times d} \quad \text{(Equation 9)}$$

The conditional moment prediction units 123 and 133 of the two moment retrieval models 120 and 130 may first predict a start time $t_{st}$ of the moment in the video corresponding to the query for the given query feature $q_x$ and final video feature $v_x^\dagger$, and predict the end time based on the predicted start time.

First, to calculate the video-query similarity $v_x^\dagger q_x \in \mathbb{R}^{N_v \times 1}$, a query sentence feature $q_x = \text{MeanPool}(\text{LSTM}(q_x)) \in \mathbb{R}^{d \times 1}$ using mean-pooling and LSTM on the word axis is used $$P(t_{st}|v_x^\dagger, q_x) = \text{Softmax}(\text{Conv1D}_{st}(v_x^\dagger q_x)) \in \mathbb{R}^{N_v \times 1} \quad \text{(Equation 10)}$$

Here, Conv1Dst may be a 1D convolution layer for embedding start time information. Next, the end time $t_{ed}$ may be predicted using prior start-time information $I_{st}$, as in Equation 11:

$$I_{st} = \sigma(\text{Conv1D}_{st}(v_x^\dagger q_x)) \in \mathbb{R}^{N_v \times 1}$$

$$P(t_{ed}|v_x^\dagger, q_x) = \text{Softmax}(\text{Conv1D}_{ed}(v_x^\dagger q_x + \alpha I_{st})) \in \mathbb{R}^{N_v \times 1} \quad \text{(Equation 11)}$$

Here, $\sigma(\cdot)$ may be a non-linear function such as ReLU, and $\alpha \in \mathbb{R}^1$ may be a learnable scalar. The two predictions $P(t_{st}|v_x^\dagger, q_x)$ and $P(t_{ed}|v_x^\dagger, q_x)$ may be trained from ground-truth start-end labels (i.e., $g_{st}, g_{ed}$) using the cross-entropy loss $CE(\cdot, \cdot)$ as in Equation 12:

$$\mathcal{L}_x = CE(g_{st}, P(t_{st}|v_x^\dagger, q_x)) + CE(g_{ed}, P(t_{ed}|v_x^\dagger, q_x)) \quad \text{(Equation 12)}$$

The biased model 120 may perform biased training from $\mathcal{L}_o$, and the naive model 130 may perform retrieval training from $\mathcal{L}_r$, according to the subscript $x \in \{r, o\}$. Meanwhile, the selective unbiased determination unit 140, which will be described later, may use the retrieval bias of the biased model 120 to perform the selective debiasing from the naive model 130.

The selective unbiased determination unit 140 may use one or more decision rules to determine whether the retrieval bias of the unbiased model 120 is the positive bias and negative bias, in which the decision rules may include the co-occurrence table and the learnable confounder. Hereinafter, the co-occurrence table will first be described.

In order to construct the co-occurrence table, the co-occurrence of predicates for each object word in the query sentence may be counted first based on the top K (e.g., K=100) frequent objects and predicates in the training queries. The counting may construct the co-occurrence table $T_d \in \mathbb{R}^{K \times K}$ between objects and predicates, and the row of the co-occurrence table $T_d$ may indicate the co-occurrence frequency of predicates for the specific object.

To negatively or positively determine the biased prediction of the biased model 120 for the contrastive learning using the naive model 130, the selective unbiased determination unit 140 may use the prior knowledge about a predominant object-predicate pair in the co-occurrence table.

For the input object words of the biased model 120, the selective unbiased determination unit 140 may identify the top n (e.g., n=10) main predicates in the co-occurrence table. When the top n predicates appear in the given query sentence, the selective unbiased determination unit 140 may determine the prediction of the biased model 120 to be positive rather than negative.

For the selective debiasing learning, a hinged loss may be used based on the video-query similarity between the naive model 130 and the biased model 120 as in Equation 13:

$$\mathcal{L}_{hinge}^n = \max[0, \Delta_n - \max(v_r^\dagger q_r) + \max(v_o^\dagger q_o)]$$

$$\mathcal{L}_{hinge}^p = \max[0, \Delta_p - \max(v_r^\dagger q_r) - \max(v_o^\dagger q_o)] \quad \text{(Equation 13)}$$

Here, $\mathcal{L}_{hinge}^n$ indicates that the retrieval bias of the biased model 120 is negative, and $\mathcal{L}_{hinge}^p$ indicates that the retrieval bias of the biased model 120 is positive. The selective unbiased determination unit 140 may select whether the retrieval bias of the biased model 120 is negative or positive. In Equation 13, $\Delta_n = 0.2$ and $\Delta_p = 0.4$ may be used, providing more margin to $\Delta_p$ to promote training for the case where the retrieval bias is positive. However, it is not limited thereto.

The co-occurrence tables may be a discrete approximation of the retrieval bias since they assume the predefined predicates to perform the selective debiasing. To better approximate this, it may be composed of K confounders (e.g., K=100) with d-dimensional learnable parameters, and use a confounder $Z \in \mathbb{R}^{K \times d}$ that may train the object-scene spurious correlations. Hereinafter, the learnable confounder, which is another decision rule of the selective unbiased determination unit 140, will be described.

Assuming that the predicate words sufficiently include the contextual meaning of the video scenes, a predicate feature $Y_B$ spuriously correlated with the object word $q_o$ may be predicted from a confounder Z. When $Y_B$ is similar to a predicate feature $Y_C$ of the original query used in the naive model 130, this indicates that the predicate $Y_B$ acquired from the object words and $Y_C$ of the given query have similar contextual meaning. Accordingly, in this case, the retrieval of the biased model 120 needs to be used positively.

In this case, Z may be pre-trained so that the generated predicate $Y_B$ is the biased predicate of the object by allowing Z to train the spurious correlation between the object and the predicate. To train Z, $Y_B$ may be regressed into $Y_C$. This means that Z is trained to generate the predicate feature $Y_B$ that typically appear together with the given object words in the query.

To this end, first, a mean-pooled object feature $q_o = \text{MeanPool}(\text{LSTM}(q_o)) \in \mathbb{R}^{1 \times d}$ for the word axis may be prepared. $q_o$ and the confounder Z perform a dot-product attention to generate $Y_B$, which causes $Y_B$ to regress to the predicate feature $Y_C$ of the original query. To obtain $Y_C$, the predicate words $W_P=\text{Pred}(W_q)$ of the original query may be sampled and the predicate word feature $q_p$ may be embedded in the same way as Equation 8. Pred(•) may refer to the predicate filtering:

$$Y_B = \text{Softmax}((q_o W_o)(ZW_z)^T)Z \in \mathbb{R}^d$$

$$Y^*_C = \text{MeanPool}(\text{LSTM}(q_p)) \in \mathbb{R}^d$$

$$\mathcal{L}_z = \|Y^*_C - Y_B\|_2^2 \quad \text{(Equation 14)}$$

Here, $W_o, W_z \in \mathbb{R}^{d \times d}$ indicates an embedding matrix, $Y^*_C$ indicates the fixed mean-pooled predicate features targeting L2 loss regression.

After pre-training the confounder Z, the selective unbiased determination unit 140 may calculate cosine similarity $r = \text{cosine}(Y_B, Y_C)$. When the calculated value of r is greater than 0, the retrieval of the biased model 120 may be used positively, otherwise it may be used negatively:

$$\mathcal{L}^D = \begin{cases} \mathcal{L}^n_{hinge} & \text{if } r \leq 0 \\ \mathcal{L}^p_{hinge} & \text{if } r > 0 \end{cases} \quad \text{(Equation 15)}$$

Figure 5:
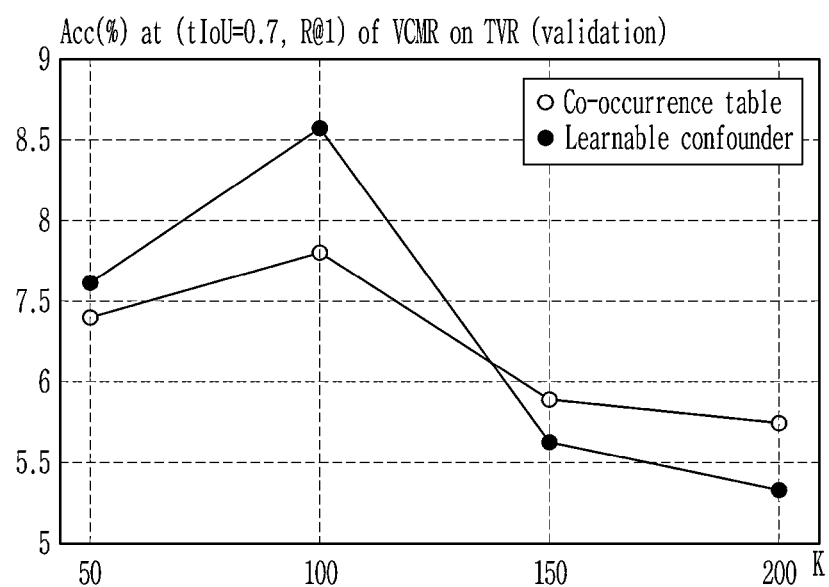
FIG. 5 is a comparison diagram of performance between different decision rules for selective unbiased decision according to some embodiments of the present disclosure.
Figure 6A:
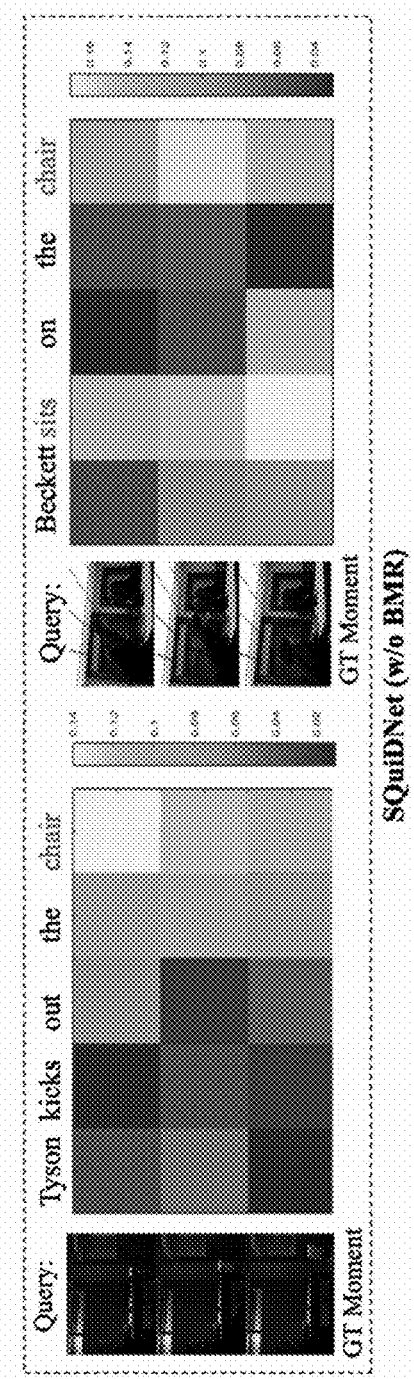
FIGS. 6A and 6B are diagrams illustrating performance of a method for video moment retrieval according to some embodiments of the present disclosure.
Figure 6B:
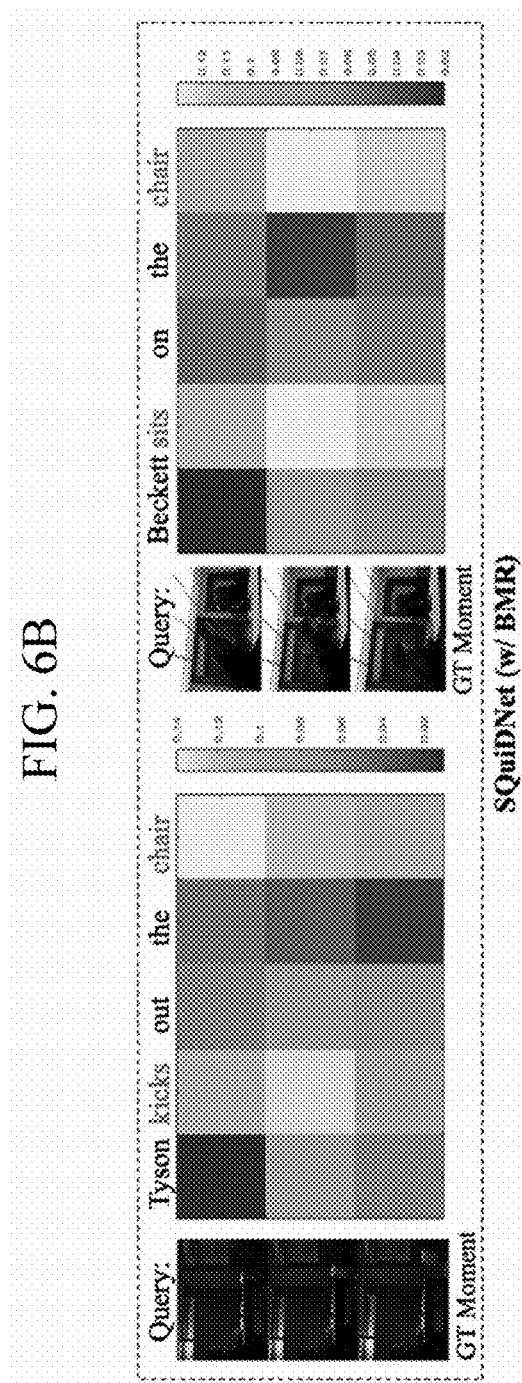
Figure 7:
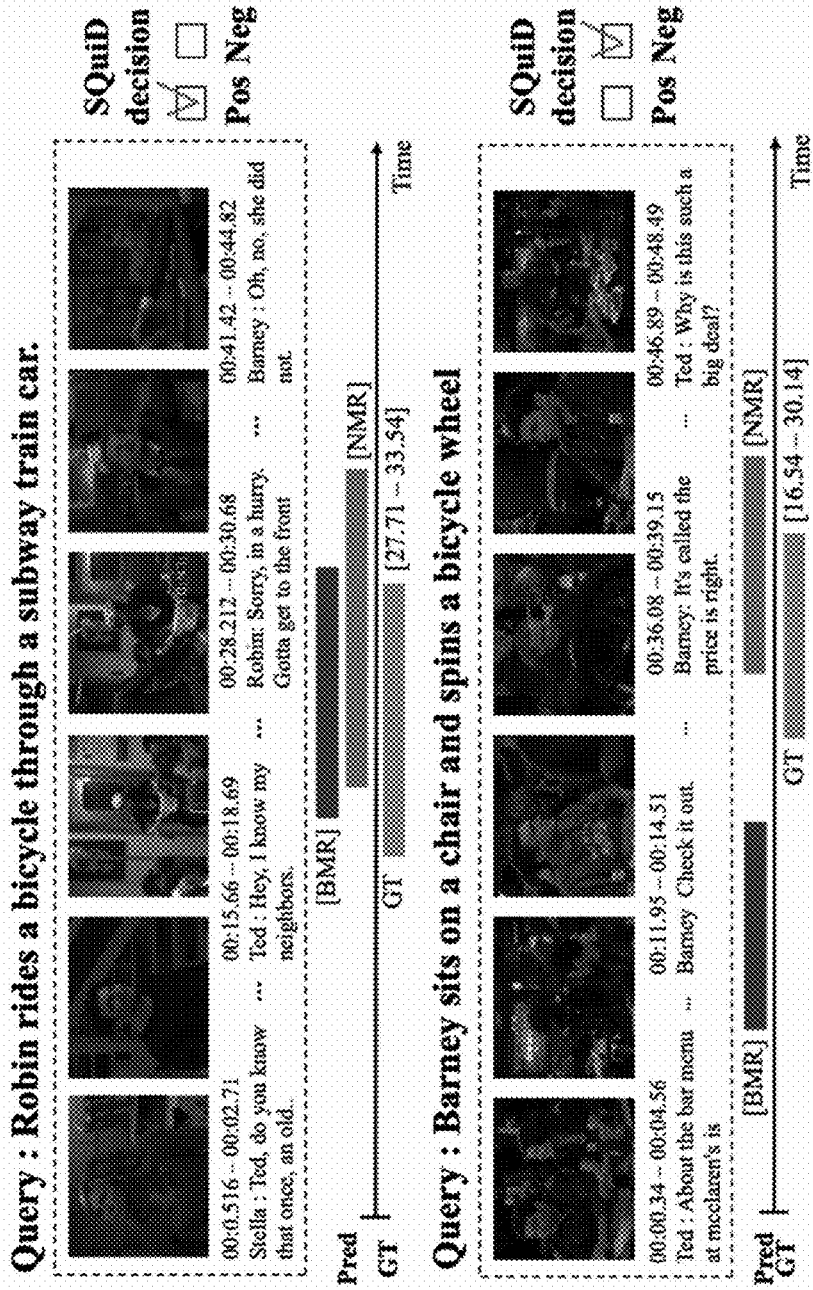
FIG. 7 is a diagram illustrating the performance of the method for video moment retrieval according to some embodiments of the present disclosure.

Hereinafter, FIGS. 5 to 7 illustrate performance evaluation results for the method for video moment retrieval of the present disclosure, respectively. To evaluate the performance, three moment retrieval benchmarks were used: TV show Retrieval (TVR), ActivityNet, and DiDeMo.

The TVR is composed of six TV shows across three genres (sitcoms, medical and crime dramas) and includes 21.8K multi-character interactive videos with subtitles and 109K queries. Each video is approximately 60 to 90 seconds long. The ActivityNet may include 20K videos including 100K query descriptions. The average length of all videos is 117 seconds, and the average query length is 14.8 words. Finally, distinct describable moments (DiDeMo) include 10k videos from various scenarios, and to alleviate complexity, most videos are about 30 seconds long and are evenly divided into 5-second segments, so a single video includes 21 possible segments.

To evaluate the performance, three retrieval tasks were performed: video retrieval (VR), single video moment retrieval (SVMR), and video corpus moment retrieval (VCMR).

The VR is video-level retrieval, and evaluates the number of accurate predictions of video, measures the video-query similarity of all videos, and selects the video with the highest value. The SVMR is moment-level retrieval of a given video, and evaluates a degree of overlap between the predicted moment and the ground-truth. The VCMR is moment-level retrieval of the video corpus, and evaluates the occurrence rate of the cases where the predicted video matches the ground-truth video and the cases where the predicted moment and the ground-truth moment overlap significantly.

In the performance evaluation, the method for video moment retrieval according to the present disclosure first predicted the top n (n=10) videos for the query and then performed the moment retrieval. The average recall in K(R@K) for the query was used as an evaluation index, and the temporal intersection over union (tIoU) indicates the overlap between the predicted moment and the ground-truth.

TABLE 1

| Method | TVR tIoU = 0.7 | | | ActivityNet tIoU = 0.7 | | | DiDeMo tIoU = 0.7 | | |
|---|---|---|---|---|---|---|---|---|---|
| | R@1 | R@10 | R@100 | R@1 | R@10 | R@100 | R@1 | R@10 | R@100 |
| XML | 3.32 | 13.42 | 30.52 | — | — | — | 1.74 | 8.31 | 27.63 |
| HERO | 6.21 | 19.34 | 36.66 | 1.19 | 6.33 | 16.41 | 1.59 | 9.12 | 29.23 |
| HAMMER | 5.13 | 11.38 | 16.71 | 1.74 | 8.75 | 19.08 | — | — | — |
| ReLoCLNet | 4.15 | 14.06 | 32.42 | 1.82 | 6.91 | 18.33 | — | — | — |
| SQuiDNet-1 | 4.09 | 12.30 | 28.31 | 1.62 | 7.82 | 18.53 | 1.73 | 9.84 | 30.14 |
| SQuiDNet-2 | 8.34 | 28.03 | 35.45 | 3.02 | 10.23 | 22.14 | 2.62 | 10.28 | 31.11 |
| SQuiDNet-3 | 10.09 | 31.22 | 46.05 | 4.43 | 12.81 | 26.54 | 3.52 | 12.93 | 34.03 |

Table 1 shows a comparison of the performances of the conventional models XML, HERO, HAMMER, and ReLoCLNet with respect to TVR, ActivityNet, and DiDeMo3 benchmarks with the method for video moment retrieval according to the present disclosure (see SQuiDNet in the table).

As shown in Table 1, the method for video moment retrieval according to the present disclosure surpasses previous state-of-the-art performance models.

In addition, Table 1 compares and verifies the case where the biased model 120 is removed in the method for video moment retrieval according to the present disclosure (see SQuiDNet-1 in the table) and the case where both the biased model 120 and the naive model 130 are included in the method for video moment retrieval according to the present disclosure (see SQuiDNet-3 in the table), respectively, to explain the effect of the selective unbiased learning.

TABLE 2

| | TVR | | | | ActivityNet | |
|---|---|---|---|---|---|---|
| | SVMR R@1, tIoU = μ | | VR | | SVMR R@1, tIOU = μ | |
| Method | μ = 0.5 | μ = 0.7 | R@1 | R@10 | Method | μ = 0.5 | μ = 0.7 |
| XML | 31.11 | 13.89 | 16.54 | 50.41 | VSLNet | 43.22 | 26.16 |
| HERO | — | 4.02 | 30.11 | 62.69 | IVG | 43.84 | 27.1 |
| ReLoCLNet | 31.88 | 15.04 | 22.13 | 57.25 | SMIN | 48.46 | 30.34 |
| SQuiDNet | 41.31 | 24.74 | 31.61 | 65.32 | SQuiDNet | 49.53 | 31.25 |

Meanwhile, Table 2 shows the results of SVMR and VR (TVR, ActivityNet), two subtasks of VCMR. The method for video moment retrieval (see SQuiDNet in the table) according to the present disclosure shows significant performance improvement in SVMR and VR, and thus, suggests that the selective bias is effective at both the moment level and the video level.

TABLE 3

| Model variants | tIoU = 0.7, R@1 |
|---|---|
| Full SQuiDNet | 8.52 |
| w/o BMR | 4.62 |
| w/o CMP | 8.17 |
| w/(All negative) | 6.41 |
| w/(All positive) | 6.72 |
| w/(Co-occurrence table) | 7.91 |
| w/(Learnable confounder) | 8.52 |

Table 3 shows the results of an ablation study for each component included in the method for video moment retrieval according to the present disclosure. The first row of Table 3 shows the performance evaluation results for the method for video moment retrieval according to the present disclosure.

The second and third rows of Table 3 show the performance evaluation results in the case where there is no biased model 120 in the method for video moment retrieval according to the present disclosure and the case where there is no conditional moment prediction unit 123 and 133 in the two moment retrieval models, respectively.

Referring to the corresponding section, it can be seen that there is the decrease in significant performance in the case where there is no biased model 120. This suggests two interpretations that the retrieval dataset contains many spurious correlations and that the effect of the selective debiasing in the video moment retrieval is not trivial.

Meanwhile, the performance improvement according to the conditional moment prediction units 123 and 133 is not as effective as the biased model 120, but actually contributes to learning efficiency by promoting early convergence of the learning loss. This is interpreted to be because the search space may be narrowed with prior knowledge about the start time by the conditional moment prediction units 123 and 133.

Fourth and fifth rows in Table 3 show the performance evaluation results in the case where all retrievals of the biased model 120 are used positively and in the case where all retrievals of the biased model 120 are used negatively, respectively. The results show that the positive use of the retrieval bias is more effective than the negative use of the retrieval bias, which suggests that the method for video moment retrieval according to the present disclosure should have discernment in selecting the biased retrievals.

Meanwhile, sixth and seventh rows in Table 3 show a comparison of the effects of one or more decision rules (i.e., co-occurrence table, learnable confounder), which may be used in the selective unbiased determination unit 140, respectively. These decision rules provide accuracy and efficiency in the moment retrieval through the selective debiasing.

FIG. 5 is a comparison diagram of performance between different decision rules for selective unbiased decision according to some embodiments of the present disclosure.

Specifically, FIG. 5 illustrates the performance of the VCMR according to the co-occurrence table and the hyperparameter K of the learnable confounder. For the co-occurrence table, K is the number of top k objects, and for the learnable confounder, K is the number of confounders.

The co-occurrence table uses the statistics of training queries to approximate the confounders, while the learnable confounders are trained from object-predicate spurious correlation according to proxy learning using the loss in Equation 14 with similar curves. However, the learnable confounders show higher performance.

From this, it may be inferred that the learnable confounder has superior control over confounders that may not be defined in a deterministic way.

FIGS. 6A and 6B are diagrams illustrating the performance of the method for video moment retrieval according to some embodiments of the present disclosure.

Specifically, FIGS. 6A and 6B illustrate query-video similarity at a word level for a ground-truth moment for the two queries "Tyson kicks out the chair" and "Beckett sits on the chair."

FIG. 6A illustrates a similarity distribution in the case where there is no biased model 120, and illustrates high similarity in the word "sit" and low similarity in the word "kick."

However, in the case where there is the biased model 120 as illustrated in FIG. 6B, both the "sit" and "kick" show high similarity.

This suggests that, when given a single object word "chair", a system without unbasing may understand the spuriously correlated predicate "sit" but fail to learn uncommon predicates such as "kick".

In other words, through the debiasing by the method for video moment retrieval according to the present disclosure, it can be seen that various connections between object words and other predicate words may be trained, and the unbiased system has higher similarity at more accurate moment, thereby strengthening the understanding of the spuriously correlated predicates.

FIG. 7 is a diagram illustrating the performance of the method for video moment retrieval according to some embodiments of the present disclosure.

Specifically, FIG. 7 illustrates the moment predictions of the naive model 130 and the biased model 120, respectively.

Here, a red box represents the prediction moment of the naive model 130, a blue box represents the prediction moment of the biased model 120, and a green box represents the ground-truth moment. The decision of the selective unbiased determination unit 140 as to whether to use the retrieval bias positively or negatively is illustrated on the right side of FIG. 7.

When the query is "Robin rides a Bicycle through a Subway Train car," both the biased model 120 and the naive model 130 predict a scene of riding a bicycle in video. Here, the selective unbiased determination unit 140 determines the prediction of the biased model 120 as the positive retrieval bias.

However, for the query "Barney sits on a chair and spins a bicycle wheel," the BMR still predicts scenes of people riding a bicycle to show a retrieval bias between the "bicycle" and the "riding".

Here, in order to respond to the retrieval bias, the selective unbiased determination unit 140 determines the prediction of the biased model 120 to be negatively biased, so the naive model 130 is trained to recede the bias predictions of the biased model 120 by the contrastive learning.

Figure 8:
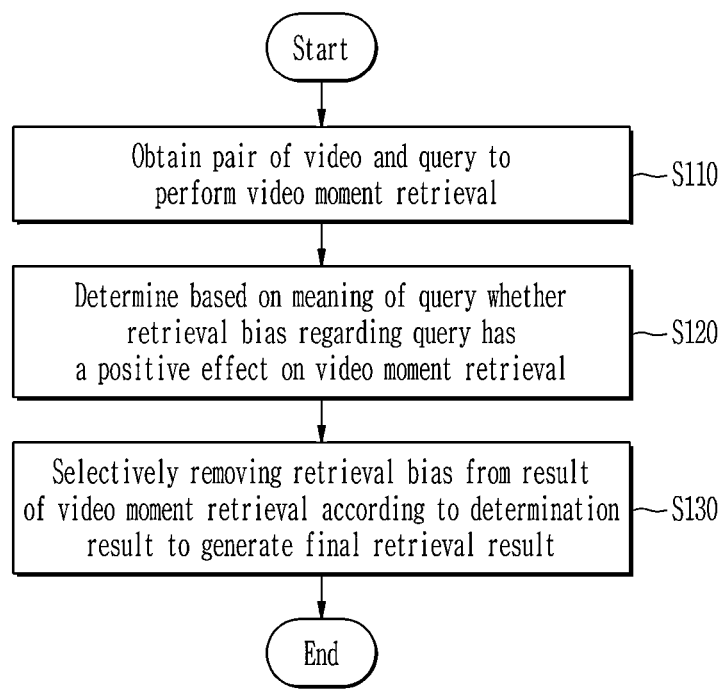
FIG. 8 is a flowchart of the method for video moment retrieval according to some embodiments of the present disclosure.

FIG. 8 is a flowchart of the method for video moment retrieval according to some embodiments of the present disclosure.

Referring to FIG. 8, first, the device 100 for video moment retrieval may obtain a pair of video and query as input to perform the video moment retrieval (S110).

Next, the device 100 for video moment retrieval may determine based on the meaning of the query whether the retrieval bias regarding the query has a positive effect on the video moment retrieval (S120).

Next, the device 100 for video moment retrieval may selectively remove the retrieval bias from the results of the video moment retrieval according to the determination result to generate the final retrieval result (S130).

Figure 9:
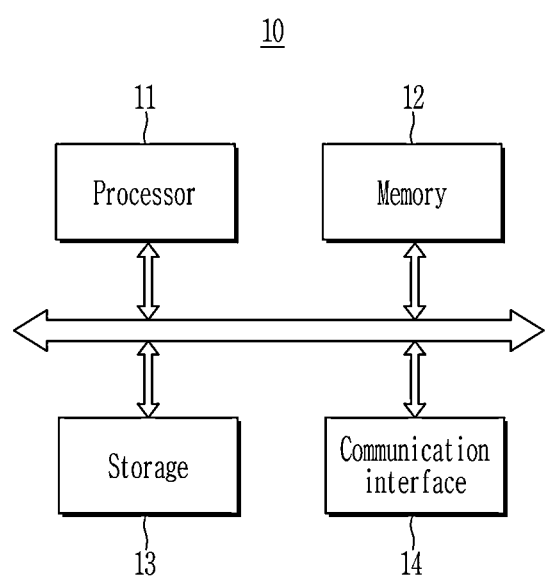
FIG. 9 is a block diagram illustrating a computing device providing the method for video moment retrieval according to some embodiments of the present disclosure.

FIG. 9 is a block diagram illustrating a computing device providing the method for video moment retrieval according to some embodiments of the present disclosure.

Here, the computing device 10 that provides the method for video moment retrieval may be the above-described device 100 for video moment retrieval, or any device (not illustrated) communicatively connected to the device 100 for video moment retrieval to provide the method for video moment retrieval. However, it is not limited thereto.

Referring to FIG. 9, the computing device 10 may include one or more processors 11, a memory 12 that loads a program executed by the processor 11, and a storage 13 that stores the program and various data, and a communication interface 14. However, the above-described components are not essential for implementing the computing device 10 according to the present disclosure, and therefore, the computing device 10 may have more or less components than the components listed above. For example, the computing device 10 may further include an output unit and/or an input unit (not illustrated), or the storage 13 may be omitted.

When loaded into the memory 12, the program may include instructions that cause the processor 11 to perform methods/operations according to various embodiments of the present disclosure. That is, the processor 11 may perform methods/operations according to various embodiments of the present disclosure by executing instructions. The program is composed of a series of computer-readable instructions grouped by function and executed by the processor.

The processor 11 controls an overall operation of each component of the computing device 10. The processor 11 may be configured to include at least one of a central processing unit (CPU), a micro processor unit (MPU), a micro controller unit (MCU), a graphic processing unit (GPU), or any type of processor well known in the art of the present disclosure. In addition, the processor 11 may perform operations on at least one application or program to execute the methods/operations according to various embodiments of the present disclosure.

The memory 12 stores various data, instructions and/or information. The memory 12 may load one or more programs from the storage 13 to execute the methods/operations according to various embodiments of the present disclosure. The memory 12 may be implemented as a volatile memory such as RAM, but the technical scope of the present disclosure is not limited thereto.

The storage 13 may non-temporarily store the programs. The storage 13 may be configured to include a nonvolatile memory, such as a read only memory (ROM), an erasable programmable ROM (EPROM), an electrically erasable programmable ROM (EEPROM), and a flash memory, a hard disk, a removable disk, or any well-known computer-readable recording medium in the art to which the present disclosure belongs. The communication interface 14 may be a wired/wireless communication module.

The embodiment of the present disclosure described above is not implemented only through the device and method, and may be implemented through a program for realizing a function corresponding to the configuration of the embodiment of the present disclosure or a recording medium in which the program is recorded Although embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A method for video moment retrieval performed by a computing device, comprising:
    obtaining a pair of video and query to perform the video moment retrieval;
    determining based on meaning of the query whether a retrieval bias regarding the query has a positive effect on the video moment retrieval to generate a determination result; and
    selectively removing the retrieval bias from a result of the video moment retrieval according to the determination result to generate a final retrieval result,
    wherein the determining whether the retrieval bias regarding the query has a positive effect on the video moment retrieval includes determining whether the retrieval bias has a positive effect on the video moment retrieval based on one or more decision rules including a co-occurrence table and a learnable confounder,
    wherein the co-occurrence table is a table constructed by counting co-occurrence of predicates for each object word in the training query so that each row represents the frequency of co-occurrence of the predicates for each object word, and
    wherein the determining whether the retrieval bias regarding the query has a positive effect on the video moment retrieval includes identifying key predicates associated with each of the object words in the query in the co-occurrence table and determining that the retrieval bias has a positive effect on the video moment retrieval when the key predicates are included in the query.

2. The method of claim 1, wherein the obtaining includes:
embedding a video feature based on the video,
matching a subtitle feature embedded based on a subtitle included in the video with the video feature to generate a subtitle-matched video feature; and
matching a query feature embedded based on the query with the subtitle-matched video feature and the query feature to generate a query-matched video feature, and
wherein the video moment retrieval is performed using the query feature and the query-matched video feature.

3. The method of claim 1, wherein the retrieval bias allows the video moment retrieval to be performed in a direction in which the retrieval result of the video moment retrieval converges on scenes that generally have a high frequency of co-occurrence with at least one object included in the query.

4. The method of claim 1, wherein the determining whether the retrieval bias regarding the query has a positive effect on the video moment retrieval includes:
retrieving, by a basic retrieval model, a moment inferred within the video based on the query;
retrieving, by a biased retrieval model, a biased moment inferred within the video based on the retrieval bias regarding the query; and
determining based on the meaning of the query whether the biased moment is positive or negative relative to the moment inferred by the basic retrieval model.

5. The method of claim 4, wherein the basic retrieval model is pre-trained to predict a start time and an end time of the moment corresponding to the query within the video according to the input of the pair of video and query, based on training dataset comprising a pair of training query and training video, and annotation for a start time and an end time of moment corresponding to the training query within the training video, and
wherein the end time is predicted based on the start time previously predicted.

6. The method of claim 4, wherein the biased retrieval model is pre-trained to predict a start time and an end time of the biased moment based on the retrieval bias regarding the query within the video according to the input of the pair of video and query, based on training dataset comprising pairs of object words in the training query and training videos.

7. The method of claim 6, wherein the end time is predicted based on the start time previously predicted.

8. The method of claim 1, wherein the learnable confounder is constructed by pre-training an object-scene spurious correlation to predict a predicate spuriously correlated with an object word from the object word, and
wherein the determining whether the retrieval bias regarding the query has a positive effect on the video moment retrieval includes
determining that the retrieval bias has a positive effect on the video moment retrieval, when a similarity between the predicate predicted by the confounder from the object word in the query and the predicate present in the query is greater than or equal to a threshold.

9. A device for video moment retrieval, comprising:
a query-video input unit configured to obtain a pair of video and query to perform the video moment retrieval; and
a selective unbiased determination unit configured to:
determine whether a retrieval bias regarding the query has a positive effect on the video moment retrieval to generate a determination result, based on meaning of the query, and
selectively remove the retrieval bias from a result of the video moment retrieval according to the determination result and generate a final retrieval result,
wherein the selective unbiased determination unit determines whether the retrieval bias has a positive effect on the video moment retrieval based on one or more decision rules including a co-occurrence table and a learnable confounder,
wherein the co-occurrence table is a table constructed by counting co-occurrence of predicates for each object word in the training query so that each row represents the frequency of co-occurrence of the predicates for each object word, and
wherein the selective unbiased determination unit identifies key predicates associated with each of the object words in the query in the co-occurrence table and determines that the retrieval bias has a positive effect on the video moment retrieval when the key predicates are included in the query.

10. The device of claim 9, wherein the query-video input unit embeds a video feature based on the video, matches a subtitle feature embedded based on a subtitle included in the video with the video feature to generate a subtitle-matched video feature, and matches a query feature embedded based on the query with the subtitle-matched video feature and the query feature to generate a query-matched video feature.

11. The device of claim 9, wherein the retrieval bias allows the video moment retrieval to be performed in a direction in which the retrieval result of the video moment retrieval converges on scenes that generally have a high frequency of co-occurrence with at least one object included in the query.

12. The device of claim 9, further comprising:
a basic retrieval model configured to retrieve a moment inferred within the video based on the query, and
a biased retrieval model configured to retrieve the biased moment inferred within the video based on the retrieval bias regarding the query,
wherein the selective unbiased determination unit,
determines based on the meaning of the query whether the biased moment is positive or negative relative to the moment inferred by the basic retrieval model.

13. The device of claim 12, wherein the basic retrieval model is pre-trained to predict a start time and an end time of the moment corresponding to the query within the video according to the input of the pair of video and query, based on training dataset comprising a pair of training query and training video, and annotation for a start time and an end time of moment corresponding to the training query within the training video, and
wherein the end time is predicted based on the start time previously predicted.

14. The device of claim 12, wherein the biased retrieval model is pre-trained to predict a start time and an end time of the biased moment based on the retrieval bias regarding the query within the video according to the input of the pair of video and query, based on training dataset comprising pairs of object words in the training query and training videos.

15. The device of claim 14, wherein the end time is predicted based on the start time previously predicted.

16. The device of claim 9, wherein the learnable confounder is constructed by pre-training an object-scene spurious correlation to predict a predicate spuriously correlated with an object word from the object word, and
wherein the selective unbiased determination unit determines that the retrieval bias has a positive effect on the video moment retrieval, when a similarity between the predicate predicted by the confounder from the object word in the query and the predicate present in the query is greater than or equal to a threshold.

* * * * *